United States Patent
Wang et al.

(10) Patent No.: US 6,185,074 B1
(45) Date of Patent: Feb. 6, 2001

(54) INERTIAL LATCH HAVING AN INTERPOSER THAT PREVENTS THE HEAD FROM LEAVING THE RAMP LOAD DURING A SHOCK EVENT

(75) Inventors: David T. W. Wang, Sunnyvale; Shawn E. Casey, San Jose, both of CA (US)

(73) Assignee: Western Digital Corporation, Irvine, CA (US)

( * ) Notice: Under 35 U.S.C. 154(b), the term of this patent shall be extended for 0 days.

(21) Appl. No.: 09/222,535

(22) Filed: Dec. 29, 1998

(51) Int. Cl.$^7$ .................................................... G11B 21/22
(52) U.S. Cl. ............................................................ 360/256.4
(58) Field of Search ......................... 360/109, 256–256.6

(56) References Cited

U.S. PATENT DOCUMENTS

| | | | |
|---|---|---|---|
| 5,023,736 | * 6/1991 | Kelsic | .................................. 360/105 |
| 5,543,986 | 8/1996 | Albrecht . | |
| 5,579,189 | 11/1996 | Morehouse et al. . | |
| 5,668,683 | 9/1997 | Stone . | |

* cited by examiner

*Primary Examiner*—A. J. Heinz
(74) *Attorney, Agent, or Firm*—Milad G Shara

(57) ABSTRACT

A disk drive includes a disk drive base, a head stack assembly pivotally coupled to the disk drive base, a ramp load coupled to the disk drive base for parking the head, and an inertial latch. The head stack assembly includes a head and a coil portion coupled to the head, the coil portion defining an inner crash stop surface and an outer crash stop surface. The inertial latch includes a unitary latch base coupled to the disk drive base, an inner crash stop and an outer crash stop. The inner crash stop is integrally formed with the latch base and contacts the inner crash stop surface to limit travel of the head in a first direction during a shock event. The outer crash stop is also integrally formed with the latch base, and contacts the outer crash stop surface to limit travel of the head in a second direction during a shock event. The inertial latch further includes a unitary latch base coupled to the disk drive base, an elongated boom pivotally coupled to the latch base, an elongated interposer pivotally coupled to the latch base, a key-shaped post and a key-shaped bore. The key-shaped post and bore define means for pivotally coupling the boom to the latch base and for preventing relative vertical movement between the boom and the latch base. The interposer interacts with the boom during a shock event and contacts the latching surface such that the head is prevented from leaving the ramp load.

20 Claims, 6 Drawing Sheets

US 6,185,074 B1

INERTIAL LATCH HAVING AN INTERPOSER THAT PREVENTS THE HEAD FROM LEAVING THE RAMP LOAD DURING A SHOCK EVENT

BACKGROUND OF THE INVENTION

1. Field of the Invention

The present invention relates to a disk drive and to an inertial latch for a disk drive. More particularly, the present invention relates to a hard disk drive ("HDD") having an inertial latch crash stop assembly to prevent the head(s) from leaving a ramp load during a shock event.

2. Description of the Prior Art and Related Information

A typical hard disk drive includes a head disk assembly ("HDA") and a printed circuit board assembly ("PCBA"). The HDA includes at least one magnetic disk ("disk"), a spindle motor for rotating the disk, and a head stack assembly ("HSA") that includes one or more read/write heads, each with at least one transducer for reading and writing data. The HSA is controllably positioned by a servo system in order to read or write information from or to particular tracks on the disk. The typical HSA has three primary portions: (1) an actuator assembly that moves in response to the servo control system; (2) a head gimbal assembly ("HGA") that extends from the actuator assembly and biases the head toward the disk; and (3) a flex cable assembly that provides an electrical interconnect with minimal constraint on movement. A "rotary" or "swing-type" actuator assembly comprises a body portion that rotates on a pivot bearing cartridge between limited positions, a coil portion that extends from one side of the body portion to interact with one or more permanent magnets to form a voice coil motor, and an actuator arm that extends from an opposite side of the body portion to support the HGA.

A typical HGA includes a load beam, a gimbal attached to an end of the load beam, and a head attached to the gimbal. The load beam has a spring function that provides a "gram load" biasing force and a hinge function that permits the head to follow the surface contour of the spinning disk. The load beam has an actuator end that connects to the actuator arm and a gimbal end that connects to the gimbal that carries the head and transmits the gram load biasing force to the head to "load" the head against the disk. A rapidly spinning disk develops a laminar air flow above its surface that lifts the head away from the disk in opposition to the gram load biasing force. The head is said to be "flying" over the disk when in this state.

Understandably, such drives may be relatively sensitive to shocks occasioned by mishandling, excessive vibrations, drops and other events causing a rapid acceleration of the disk drive. Indeed, should the head crash into a spinning disk because of a rotational shock, for example, debris may be generated which may lead to read or write errors or may result in hard disk drive failure.

In an effort to mitigate the effects of such shocks (e.g., rapid accelerations), a number of latches have been developed to latch the HSA and prevent the head(s) from contacting the disk(s). The operative mechanism of such latches may be mechanical, electromechanical or magnetic in nature. The first function of a latch is typically to limit the travel of the HSA both toward the inner diameter (hereafter "ID") and toward the outer diameter (hereafter "OD") of the disk. The second function typically discharged by such latches is to prevent the heads of the HSA from leaving the ramp load (if a ramp load is present) or a landing zone on the disk (if a landing zone is present around, for example, the ID of the disk) during shock events that might otherwise jolt the heads from the ramp or landing zone and onto the data-carrying portion of the disk during non-operative conditions of the drive. However, existing latches suffer from a number of disadvantages.

Electromechanical latches and magnetic latches, for example, generally suffer from an excessively complex structure, high cost and limited shock performance. Indeed, electromechanical and magnetic latches conventionally rely on a metallic tang or similar structure protruding from the overmolded voice coil portion of the HSA. Either a permanent magnet or an electromagnet is then typically used to attract the tang and to latch the HSA when the drive is not in operation. The use of electromagnets and/or permanent magnets increases the complexity and hence the manufacturing cost of the drive. Moreover, to ensure adequate shock protection, the latching force (the force with which the latch holds the HSA tang to the permanent or electro-magnet) must be sufficiently strong. In the case of a permanent magnet, however, a high magnitude latching force requires a correspondingly high de-latching force to free the HSA tang from the attractive force of the magnet. Such de-latching force is typically achieved by so-called "resonance de-latching", wherein alternating current is applied to the voice coil portion of the HSA to cause the HSA to vibrate at a particular resonant frequency to break free of the attractive force of the permanent magnet. The stronger the magnet, however, the greater the current is necessary to de-latch the HSA when the drive is called into active operation. In turn, such large de-latching current requires a higher capacity current driver, again further increasing cost and complexity. The permanent magnets used in magnetic latches, moreover, are often composite magnets. It may be possible, over time, for the magnetic material of such composite magnets to become dislodged and damage the disk medium.

Mechanical latches, on the other hand, provide some relief from the constraints inherent in the use of electromechanical and magnetic latches. However, purely mechanical latches are not believed to be effective in handling shock events of great magnitude or to exhibit a response time that is sufficiently rapid to secure the actuator assembly during high intensity and/or longer duration shock events. Moreover, the complexity of such mechanical latches places further demands upon the manufacturing and assembly of the drive components.

For example, one such prior art latch is an inertial latch for a ramp load hard disk drive used in mobile computing applications which includes numerous plastic and stamped metal parts, as well as an inertia-increasing weight which all must be joined together to form the latch, further contributing to relatively high costs and complex assembly steps. The plastic parts form separately manufactured inner and outer crash stops attached to a hard disk drive base. Also, a plastic interposer is coupled to the hard disk drive base via a metal pin attached to the base and a corresponding bore in the interposer. An elongated metal boom, having the inertia-increasing weight attached at one end of the boom, is coupled to the inner crash stop via a metal pin protruding from the inner crash stop and a corresponding bore in the boom. The outer crash stop includes a magnet for "latching" the head stack assembly when the heads are "parked" on a ramp load. A metallic member on a coil portion of the head stack assembly functions to latch onto the magnet such that latching occurs. When the hard disk drive is subjected to a shock event, the interposer and the boom interact to prevent the heads from leaving the ramp load. A protrusion from the coil portion contacts the interposer to prevent the heads from leaving the ramp load. A metal member on the interposer interacts with the voice coil motor magnets to return the interposer to its initial position, i.e., the interposer's position prior to the shock event. While such an inertial is suitable for its intended purpose, the numerous plastic and stamped metal parts, as well as the inertia-increasing weight, must all be joined together to form the latch, which contributes to relatively high costs and complex assembly steps.

SUMMARY OF THE INVENTION

In one embodiment thereof, the present invention can be regarded as a disk drive comprising a disk drive base, a head stack assembly pivotally coupled to the disk drive base, a ramp load coupled to the disk drive base for parking the head, and an inertial latch. The head stack assembly includes a head and a coil portion coupled to the head; the coil portion defining an inner crash stop surface and an outer crash stop surface. The inertial latch includes a unitary latch base coupled to the disk drive base, an inner crash stop and an outer crash stop, both the inner crash stop and the outer crash stop being integrally formed with the latch base. The inner crash stop contacts the inner crash stop surface to limit travel of the head in a first direction, whereas the outer crash stop contacts the outer crash stop surface to limit travel of the head in a second direction.

According to further embodiments, the inner crash stop may comprise a resilient U-shaped member. The outer crash stop may comprise a contact surface that is substantially tangent to the outer crash stop surface when the outer crash stop surface contacts the outer crash stop. The outer crash stop may comprise an elongated and resilient L-shaped arm. The disk drive base may define a base bore having a base bore axis, and the latch base may include an integrally molded peg adapted to fit within the base bore, the peg having a peg axis that is offset from the base bore axis to provide an interference fit of the peg to the base bore to couple the inertial latch to the disk drive base.

According to another embodiment, the present invention can be regarded as a disk drive comprising a disk drive base, a head stack assembly pivotally coupled to the disk drive base, a ramp load coupled to the disk drive base to park the head and an inertial latch. The head stack assembly includes a head and a coil portion coupled to the head, the coil portion having a latching surface. The inertial latch includes a unitary latch base coupled to the disk drive base, an elongated boom pivotally coupled to the latch base, a key-shaped post, a key-shaped bore and an elongated interposer pivotally coupled to the base. The key-shaped post and the key-shaped bore define means for pivotally coupling the boom to the latch base and for preventing relative vertical movement between the boom and the latch base. The interposer interacts with the boom during a shock event to contact the latching surface such that the head is prevented from leaving the ramp load.

A portion of the key-shaped post may be aligned with a key axis and the key-shaped bore may be aligned with a bore axis, the key axis being substantially parallel to the bore axis during assembly of the inertial latch and generally perpendicular to the bore axis when the inertial latch is in an operational state. The latch base, the boom and the interposer may be formed of plastic. A spring (a stainless steel torsion spring, for example) may be coupled to the latch base and to the interposer, to bias the interposer in a position allowing the head to leave the ramp load. The boom has a first inertia and the interposer has a second inertia, and the first inertia may be greater than the second inertia. The elongated boom may be pivotally coupled to the unitary latch base about a pivot axis, and the boom may have a center of gravity that is offset from the pivot axis to create a moment, causing the interposer to pivot relative to the latch base and to contact the latching surface during the shock event. The elongated boom may include a plastic arm portion, the arm portion bending to maintain the interposer in contact with the latching surface during at it least a portion of a duration of the shock event. The disk drive base may define a base bore having a base bore axis and the latch base may include an integrally molded peg adapted to fit within the base bore, the peg having a peg axis that is offset from the base bore axis to provide an interference fit of the peg to the base bore to couple the inertial latch to the disk drive base. The key-shaped post may be integrally formed with the latch base and the key-shaped bore may be positioned on the boom. The means for preventing relative vertical movement may include a pair of spaced-apart bumps integrally formed on the key-shaped post.

Acorrding to a still further embodiment, the present invention can be regarded as a disk drive comprising a disk drive base, a head stack assembly pivotally coupled to the disk drive base, a ramp load coupled to the disk drive base to park the head and an inertial latch. The head stack assembly includes a head and a coil portion coupled to the head, the coil portion having a latching surface. The inertial latch includes a unitary latch base coupled to the disk drive base, an elongated interposer pivotally coupled to the latch base to contact the latching surface during a shock event such that the head is prevented from leaving the ramp load. The inertial latch further includes a split post having a first post and a second post spaced-apart from the first post and a bore that defines, together with the split post, means for pivotally coupling the interposer to the latch base and for preventing relative vertical movement between the interposer and the latch base.

The first post may be terminated by a first snap feature and the second post may be terminated by a second snap feature. The first and second snap features may define the means for preventing relative vertical movement between the interposer and the latch base. The split post may be integrally formed with the latch base and the bore may be positioned on the interposer. The latch base, the boom and the interposer may be formed of plastic. A spring (a stainless steel torsion spring, for example) may be coupled to the latch base and to the interposer to bias the interposer in a position that allows the head to leave the ramp load. The disk drive base may define a base bore having a base bore axis and the latch base may include an integrally molded peg adapted to fit within the base bore, the peg having a peg axis that is offset from the base bore axis to provide an interference fit of the peg to the base bore to couple the inertial latch to the disk drive base.

DESCRIPTION OF THE PREFERRED EMBODIMENTS

Figure 1:
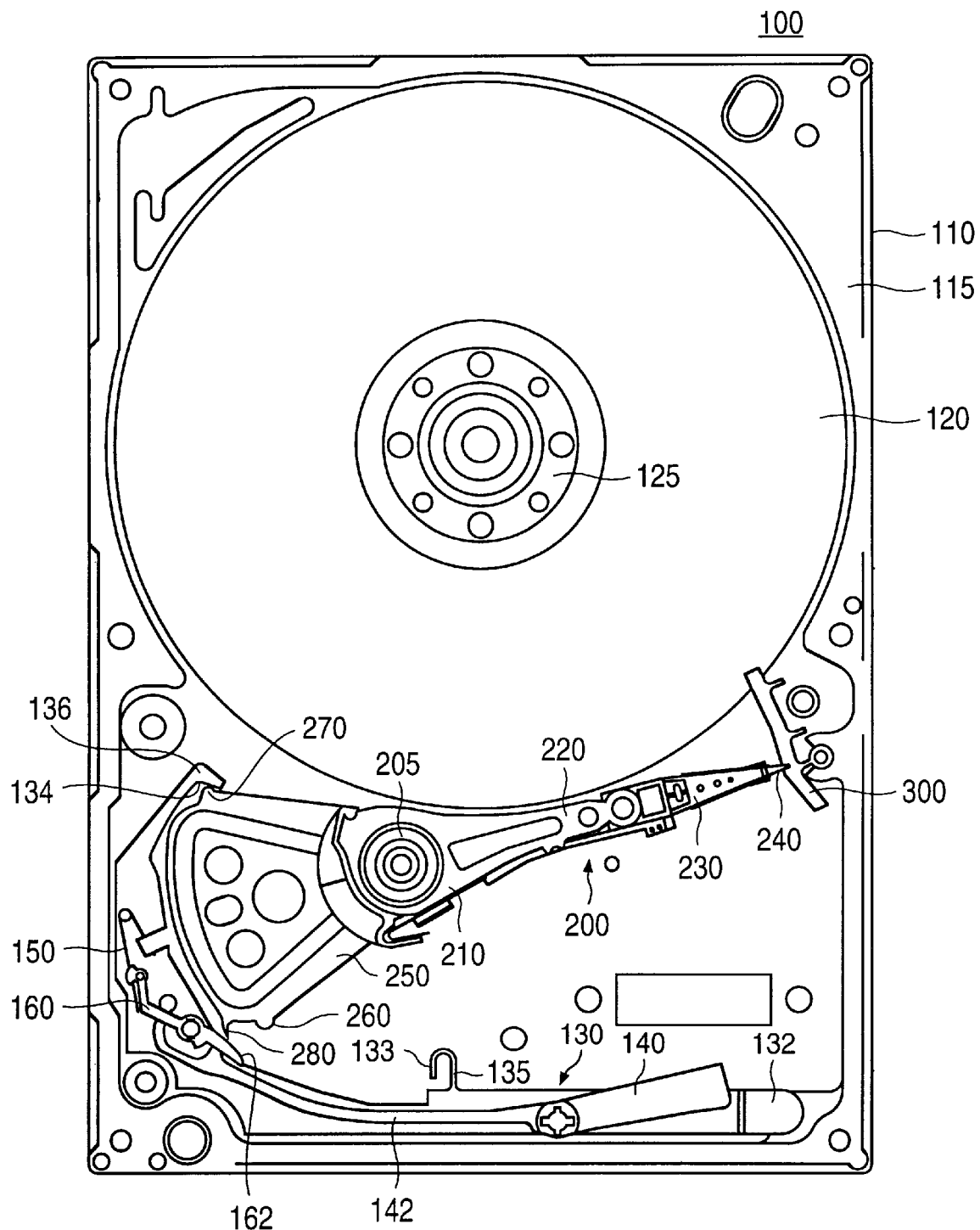
FIG. 1 is a plan view of a magnetic hard disk drive including an inertial latch crash stop assembly according to an embodiment of the present invention. The cover of the disk drive is not shown, for ease of illustration.

FIG. 1 is a plan view of a magnetic hard disk drive 100 including an inertial latch crash stop assembly ("inertial latch") 130, according to an embodiment of the present invention. The disk drive 100 includes a disk drive base 110. A mating cover (not shown) fastens onto the disk drive base 110 to form an enclosure and to seal the disk drive components between the disk drive base 110 and the cover. The disk drive base 110 includes a disk drive base interior surface 115 onto which the constituent elements of the drive may be mounted. The HSA 200 is pivotally supported on the disk drive base 110 by a stainless steel pivot bearing cartridge 205 defining a longitudinal pivot axis of the HSA. The magnetic disk(s) 120 (only one such disk 120 is visible in the plan view of FIG. 1) is rotated by a spindle motor 125 attached to the disk drive base 110. The spindle motor 125 rotates the disk 120, preferably, at a constant angular velocity. The HSA 200 includes a body portion 210, at least one actuator arm 220 cantilevered from the body portion 40, and a coil portion 250 cantilevered from the body portion 210 in an opposite direction from the actuator arm 220. The actuator arm 220 supports the HGA 230, which itself supports a head (not shown) at its far end. The head is biased toward and moveable over the disk 120. The HSA 200 is pivotally secured to the disk drive base interior surface 115 via the pivot bearing cartridge 205 so that the head at the distal end of the HGA 230 may be moved over a recording surface of the disk 120. The storage capacity of the disk drive 100 may be increased by including several disks 120 and an HSA 200 having a vertical "stack" of HGAs 230 supported by multiple actuator arms 220.

A ramp load 300 is secured to the disk drive base 110. The ramp load 300 prevents the head(s) from unintended contact with the recording surface of the disk(s) 120. When the head(s) is in the position illustrated in FIG. 1, the head(s) of the HSA 200 is said to be "parked". Each HGA 230 may include a finger 240 that projects from the distal-most point of the HGA 230. The finger 240 engages a sloped ramp surface of the ramp load 300 during head load and unload operations.

The coil portion 250 of the disk drive 100 is coupled to the head(s) and may be overmolded with a plastic material. According to an embodiment of the present invention, the overmolded coil portion 250 defines an inner crash stop surface 260 and an outer crash stop surface 270. Preferably, the inner crash stop surface 260 and the outer crash stop surface 270 are integrally molded in and project from the plastic overmold of the coil portion 250. Alternatively, the inner crash stop surface 260 and an outer crash stop surface 270 may be formed of another material, such as metal.

The disk drive 100 according to the present invention includes an inertial latch 130 that includes a unitary inertial latch base 132, an elongated boom 140, an interposer 160 and a spring 150. The inertial latch 130 is shown coupled to the disk drive base 110 in FIG. 1, whereas the inertial latch 130 is shown separated therefrom in FIG. 2. FIG. 3 shows the inertial latch base 132 alone to illustrate further details of the inertial latch 130 according to an embodiment of the present invention. The detailed description below refers to FIGS. 1–3 collectively.

Figure 2:
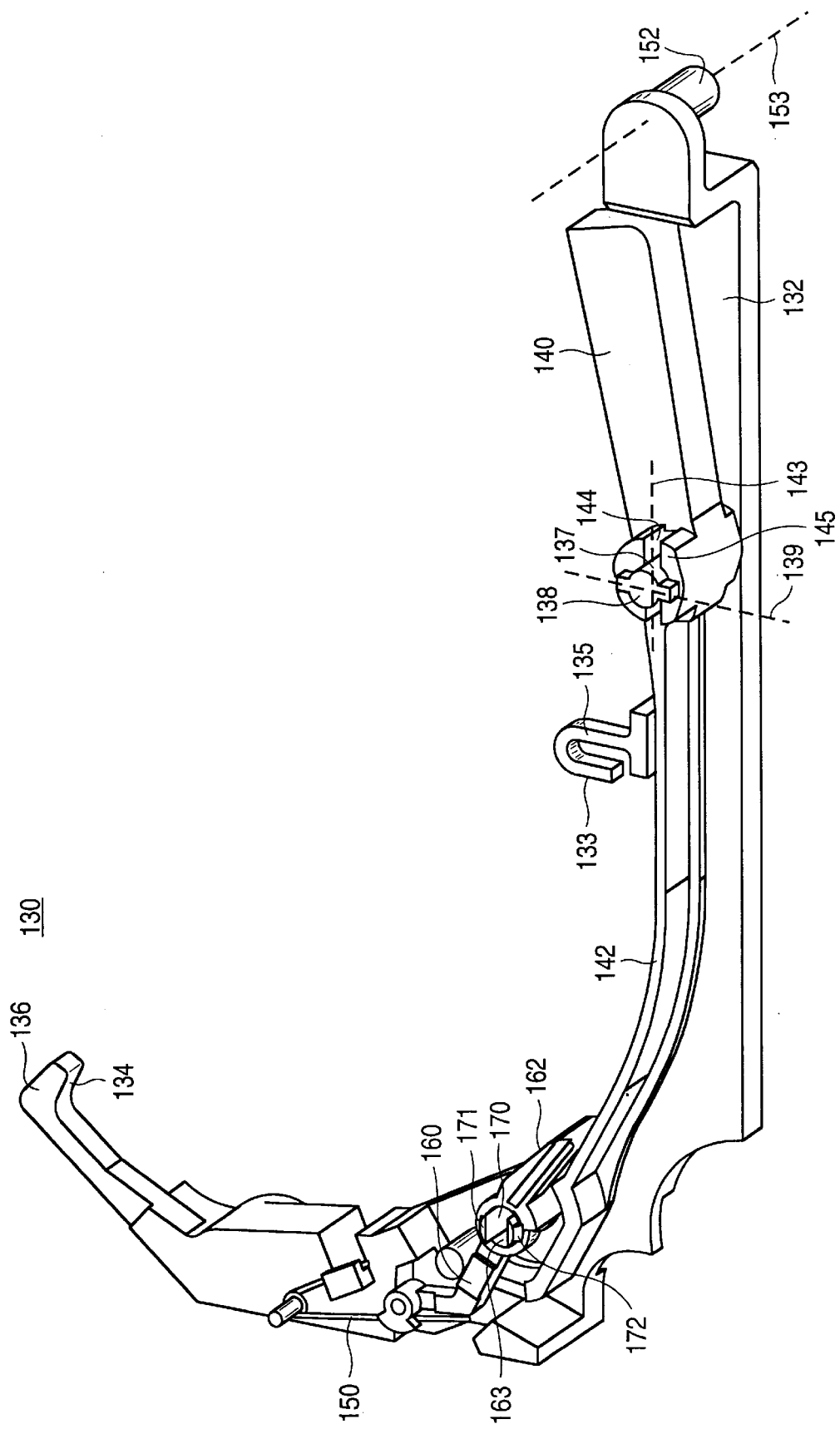
FIG. 2 is a perspective view of an embodiment of the inertial latch assembly shown in FIG. 1.
Figure 3:
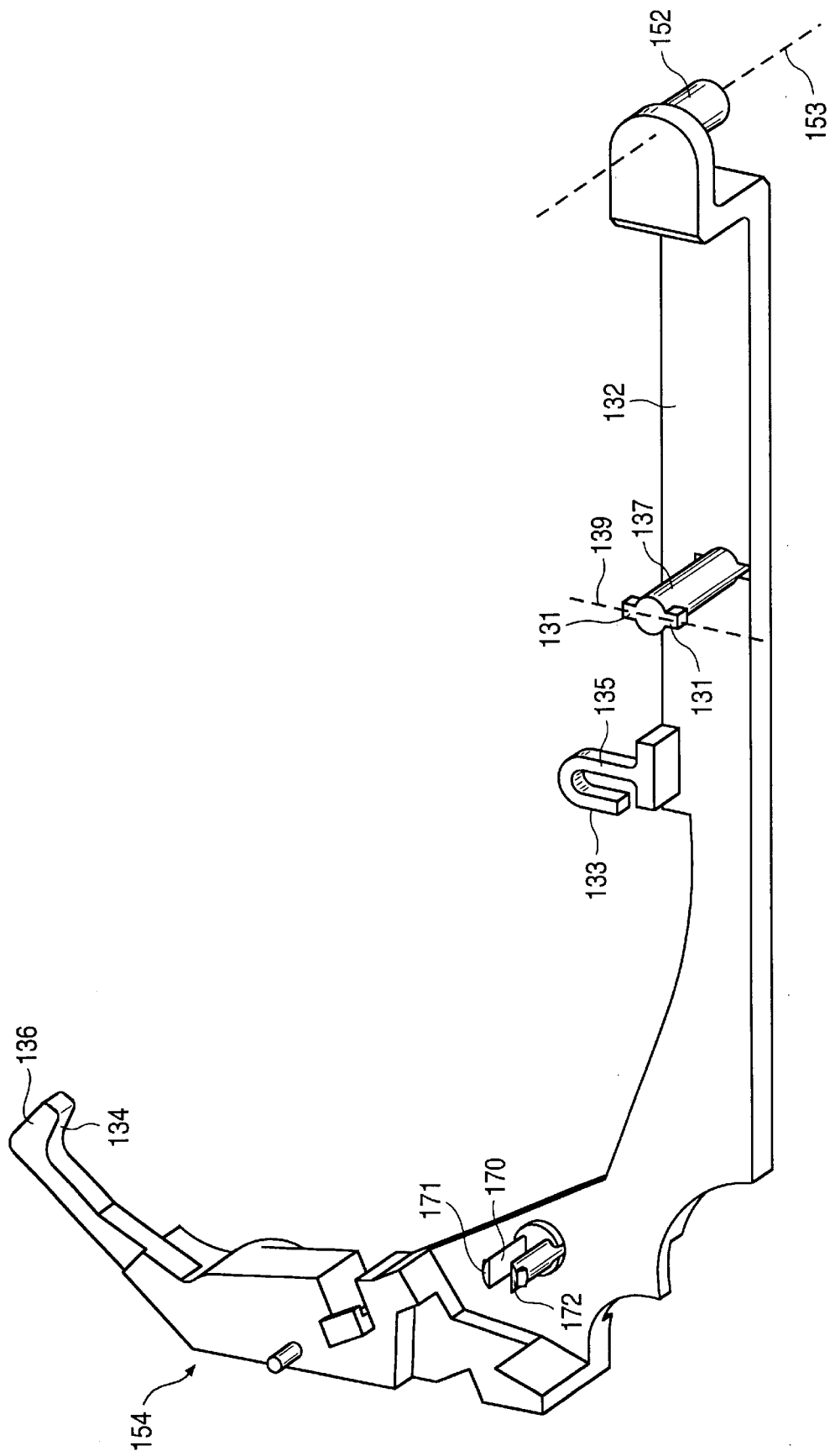
FIG. 3 is a perspective view of the latch base of the inertial latch assembly shown in FIG. 2.

The inertial crash stop assembly 130 according to the present invention and as shown in FIGS. 1, 2 and 3 is a purely mechanical inertial latch, the assembly 130 being devoid of magnetic, electomagnetic or electrical means for latching the HSA 200. Preferably, the entire inertial latch 130, except the spring 150, is formed of plastic (by a plastic injection molding process, for example). Alternatively, other materials may be substituted for the constituent elements of the inertial latch 130.

Figure 4:
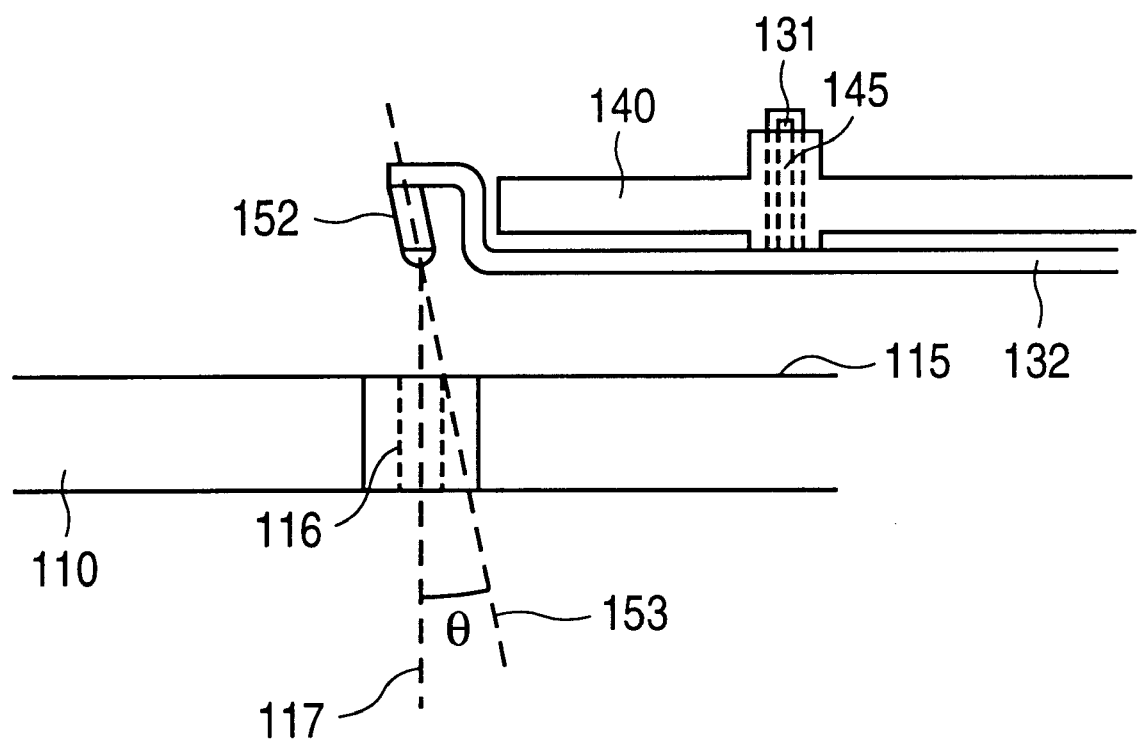
FIG. 4 is a partial side view of the inertial latch assembly, further illustrating the manner with which the inertial latch assembly is coupled to the hard disk drive base, according to an embodiment of the present invention.

As shown in FIG. 1, the unitary latch base 132 is coupled to the disk drive base 110. FIG. 4 shows a side view of a portion of the inertial latch 130 and the manner in which it couples to the disk drive base 110. As shown therein, the unitary latch base 132 includes an integrally molded peg 152 aligned with a peg axis 153. The disk drive base 110 defines a base bore 116 aligned with a base bore axis 117. The base bore 116 within the disk drive base 110 is adapted to receive the integrally molded peg 152 of the inertial latch base 132. To securely couple the inertial latch 130 to the disk drive base 110, the peg axis 153 is offset from the base bore axis 117 and forms a non-zero angle θ therewith, thereby providing an interference fit of the integrally molded peg 152 to the base bore 116. At least one additional peg may project form the inertial latch base 132 to a corresponding base bore (no shown) in the disk drive base 110. Such additional peg or pegs may also, but need not necessarily, provide an interference fit with its corresponding additional base bore. In one embodiment of the present invention, such an additional peg may be disposed near the opposite end of the inertial latch base 132, such as at a position corresponding to or near the arrow 154 in FIG. 3. In this manner, the latch base 132, and thus the inertial latch 130, is filly self-mounting to the disk drive base 110, the inertial latch 130 not requiring any additional fasteners, such as adhesives and/or screws, to be securely coupled to the disk drive base 110.

Returning now to FIGS. 1–3, the inertial latch base 132, according to an embodiment of the present invention, includes an inner crash stop 135 that is integrally formed with the latch base 132. As the HSA 200 pivots, the inner crash stop surface 260 integrally formed in the coil portion 250 of the HSA 200 contacts the inner crash stop 135 when the HSA 200 has traveled a predetermined distance limit in a first direction, such as toward the ID of the disk(s) 120. Indeed, when the HSA 200 has reached the predetermined limit toward the ID of the disk(s) 120, for example, the inner crash stop surface 260 of the coil portion 250 contacts a corresponding contact surface 133 of the inner crash stop 135 to halt the motion of the HSA 200 toward the ID of the disk(s) 120. To provide some measure of resiliency to this contact between the inner crash stop surface 260 and the inner crash stop 135, the crash stop 135 may generally be U-shaped. As the inner crash stop surface 260 of the HSA 200 contacts the inner crash stop 135, the free end of the crash stop 135 may resiliently deform somewhat in the direction of the end thereof that is attached to the latch base 132, thereby absorbing a portion of the force imparted to the latch base 132 by the shock and cushioning the impact of the HSA 200 against the inertial latch 130. The inertial latch base 132, according to an embodiment of the present invention, also includes an outer crash stop 136 that is integrally formed with the latch base 132. As the HSA 200 pivots, the outer crash stop surface 270 integrally formed in the coil portion 250 of the HSA 200 contacts the outer crash stop 136 when the HSA 200 has traveled a predetermined distance limit toward a second direction, such as toward the OD of the disk(s) 120. Indeed, when the HSA 200 has reached the predetermined distance toward the OD of the disk(s) 120, the outer crash stop surface 270 of the coil portion 250 contacts a corresponding contact surface 134 of the outer crash stop 136 to halt the motion of the HSA 200 toward the OD of the disk(s) 120. The contact surface 134, according to an embodiment of the present invention, is substantially tangent to the outer crash stop surface 270 when the outer crash stop surface 270 contacts the outer crash stop 136, as shown in FIG. 1. The outer crash stop 136 may be somewhat resilient, to thereby absorb a portion of the force imparted to the latch base 132 as the HSA 200 contacts (abuts against) the contact surface 134 of the outer crash stop 136. As shown, the outer crash stop 136 may include an elongated L-shaped arm, the free end of the L-shaped arm constituting the crash stop 134.

According to a further embodiment of the present invention, the inertial latch 130 also includes an elongated boom 140 pivotally coupled to the latch base 132. According to the present invention, the inertial latch 130 may also include a key-shaped post 137 and a key-shaped bore 145, as best seen in FIGS. 2 and 3. Together, the key-shaped post 137 and the key-shaped bore 145 define means for pivotally coupling the elongated boom 140 to the latch base 132 and for preventing relative vertical movement between the elongated boom 140 and the latch base 132. FIG. 2 shows the key-shaped post 137 and the key-shaped bore 145 pivotally coupling the elongated boom 140 to the latch base 132. As shown therein, the key-shaped post 137 is integrally formed with the latch base 132 and the key-shaped bore 163 is positioned within the elongated boom 140 and may be integrally formed therewith. As best seen in FIG. 3, the key-shaped post 170 may be integrally formed with the latch base 132. The key-shaped post 137 may include a cylindrical portion rising from the latch base 132 and may be terminated by a pair of spaced apart bumps 131 integrally formed thereon. The spaced apart bumps 131, in combination with the key-shaped bore within the elongated boom 140, prevent relative vertical movement of the elongated boom 140 relative to the latch base 132. Within the context of the present invention, the term "vertical" refers to a direction generally parallel to the key-shaped post 137, irrespective of the physical orientation of the disk drive 100. To assemble the elongated boom 140 onto the latch base 132, the boom 140 is oriented such that the axis 143 of the key-shaped bore 145 is substantially aligned (i.e., substantially parallel) to the axis 139 of the key-shaped post 137, the axis 139 of the key-shaped post 137 being substantially aligned with the spaced apart bumps 131. The elongated boom 140 is then lowered onto the latch base 132 until the spaced apart bumps 131 protrude therefrom, whereupon the boom 140 is pivoted about the key-shaped post 137 to assume the general orientation shown in FIG. 2. In this orientation of the elongated boom 140 relative to the latch base 132, the axis 143 of the key-shaped bore 145 is generally perpendicular to the axis 139 of the key-shaped post 137. According to a further embodiment of the present invention and in contradistinction to the embodiments shown in FIGS. 1–3, the key-shaped post 137 may be integrally formed with the elongated boom 140, whereas the key-shaped bore 145 may be integrally formed with the latch base 132. To further secure the inertial latch 130, the disk drive cover (not shown) may contact and exert a force on the top surface 138 of the key-shaped post 137, for example, when the disk drive cover and disk drive base 110 are mated and secured to one another.

Figure 5:
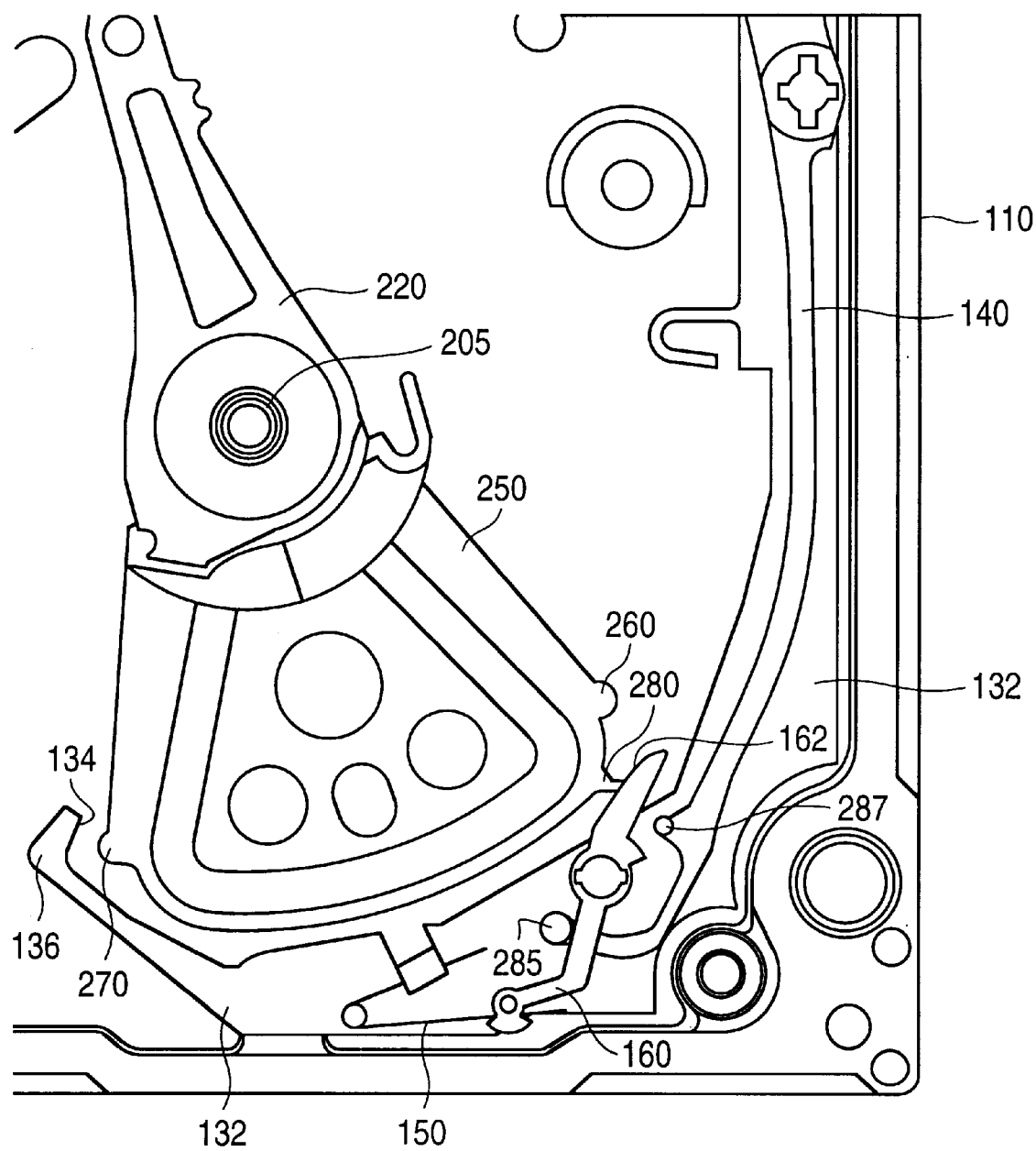
FIG. 5 shows a partial plan view of the disk drive according to the present invention, showing additional details of the operation of the inertial latch of FIGS. 1–4 when the elongated boom is in a first latching position.
Figure 6:
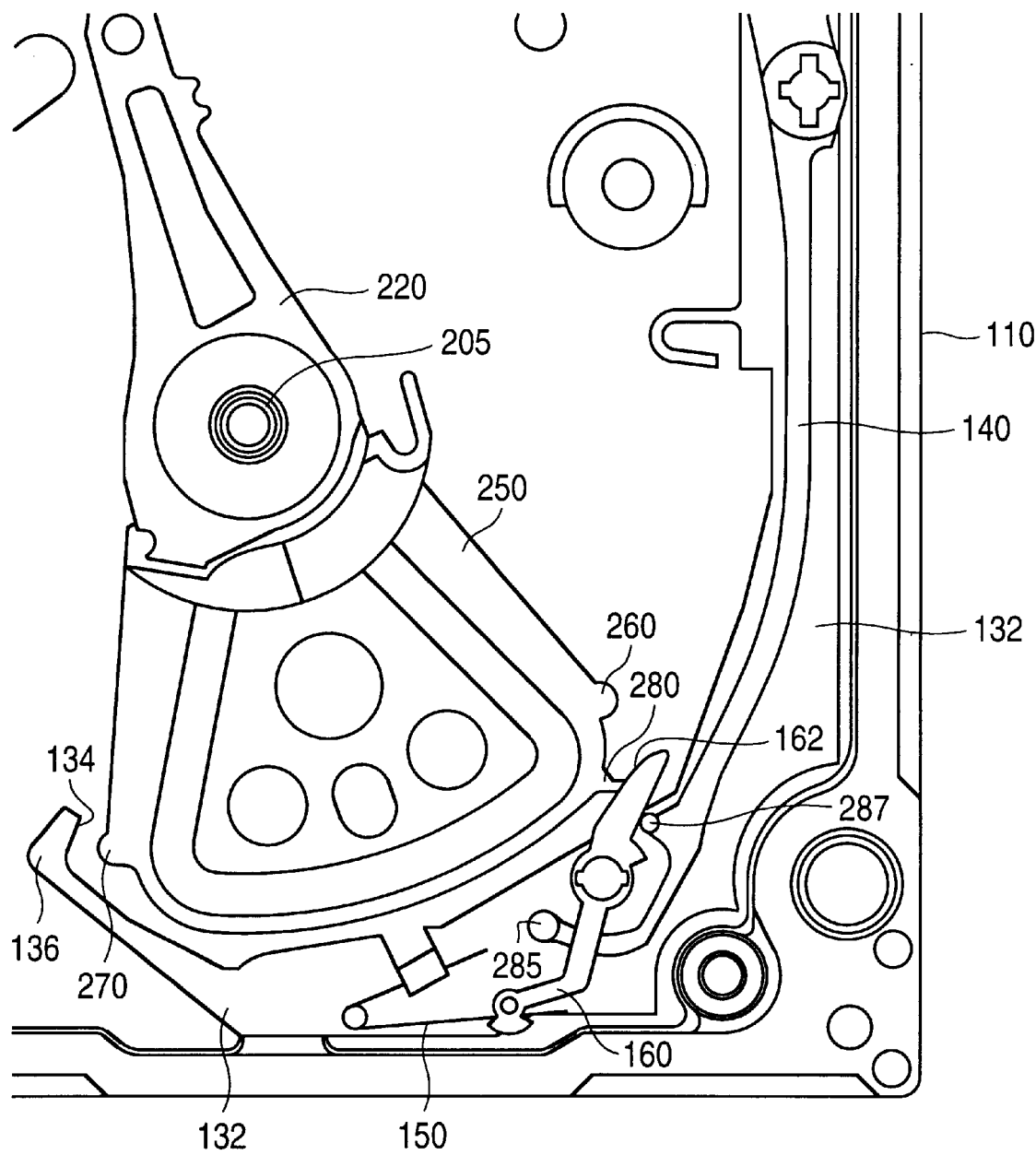
FIG. 6 shows the partial plan view of the disk drive of FIG. 5, showing additional details of the operation of the inertial latch of FIGS. 1–4 when the elongated boom is in a second latching position.

The inertial latch 130 also includes an elongated interposer 160 that is pivotally coupled to the latch base 132. According to the present invention, the interposer 160 interacts with the elongated boom 140 during a shock event to contact and engage a latching surface 280 on the coil portion 250 to prevent the head(s) of the HSA 200 from leaving the ramp load 300. Indeed, the interposer 160 includes a catch surface 162 that catches the latching surface 280 of the voice coil portion 250 when the interposer 160 pivots, as shown in FIGS. 5 and 6. The interposer 160 pivots, according to an embodiment of the present invention, when acted upon by the elongated boom 140. The elongated boom 140, in turn, is pivotally coupled to the unitary latch base 132 about a pivot axis defined by key-shaped post 137. The boom 140 has a center of gravity that is offset from the pivot axis, thereby creating a moment, which in turn creates a torque causing the interposer 160 to pivot relative to the latch base 132 to contact (e.g., to catch or to engage) the latching surface 280 of the voice coil portion 250 during a shock event, whether rotational or linear in nature. Indeed, during a shock event that tends to rotate the drive 100 (e.g., during a rotational shock), for example, the boom 140 tends to resist the rotational motion imparted to the drive 100. In so doing, the elongated boom 140 contacts and pushes against the elongated interposer 160 to cause the latter to pivot about its pivot axis and to catch the latching surface 280 of the voice coil portion 250 during a shock event. As the inertia of the elongated boom 140, according to the present invention, is greater than the inertia of the elongated interposer 160, the boom 140 succeeds in pivoting the interposer 160 about its axis, as the interposer 160 exhibits a greater susceptibility to changes in acceleration (i.e., it has a lesser inertia) than does the boom 140.

FIG. 5 shows the elongated boom 140 in a first latching position, wherein a shock event has caused the boom 140 to pivot in a counterclockwise direction as it resists the acceleration imparted to the disk drive 100. In the first latching position illustrated in FIG. 5, a first bearing surface 285 pushes against the interposer 160 on a first side and at a first end thereof to cause the interposer 160 to pivot (also in a counterclockwise direction in this embodiment) about its pivot point. As the interposer 160 pivots, its catch surface 162 engages the latching surface 280 of the voice coil portion 250 of the HSA 200, and limits the pivot of the HSA 200 to a range between the outer crash stop contact surface 134 and a position wherein the interposer catch surface 162 contacts the latching surface 280 of the voice coil portion 250. When the latching surface 280 of the voice coil portion 250 and the interposer 160 are in the relative positions illustrated in FIG. 5, the head(s) of the HSA 200 is effectively confined to the ramp load 300, thus preventing the head(s) from leaving the ramp load 300 and inadvertently contacting (e.g., crashing) into the disk or disks 120 during a shock event.

FIG. 6 illustrates another aspect of the operation of the inertial latch 130, wherein the elongated boom 140 is in a second latching position. As shown therein, the boom 140 is in a second latching position, a shock event having caused the boom 140 to pivot in a clockwise direction as it resists the acceleration imparted to the disk drive 100. In the second latching position illustrated in FIG. 6, a second bearing surface 287 pushes against the interposer 160 on a second side and second end thereof to cause the interposer 160 to pivot (also in a clockwise direction in this embodiment)

about its pivot point. As the interposer 160 pivots, its catch surface 162 engages the latching surface 280 of the voice coil portion of the HSA 200, and again limits the pivot of the HSA 200 to a range between the outer crash stop contact surface 134 and a position wherein the interposer catch surface 162 contacts the latching surface 280 of the voice coil portion 250. When the latching surface 280 of the voice coil portion 250 and the interposer 160 are in the relative positions illustrated in FIG. 6, the head(s) of the HSA 200 is again effectively confined to the ramp load 300, thus preventing the head(s) from leaving the ramp load 300 and inadvertently contacting (e.g., crashing) into the disk or disks 120.

According to another embodiment of the present invention, the inertial latch 130 includes a bore 163 and split post 170 (seen most clearly in FIGS. 2 and 3), the split post 170 having a first post and a second post spaced-apart from the first post. Together, the bore 163 and the split post 170 define means for pivotally coupling the interposer 160 to the latch base 132 and for preventing relative vertical movement between the interposer 160 and the latch base 132. In a further embodiment of the present invention, the first post is terminated by a first snap feature 171 and the second post is terminated by a second snap feature 172, the first snap feature 171 and the second snap feature 172 defining the means for preventing relative vertical movement between the interposer 160 and the latch base 132. The bore 163 may be formed within the interposer 160, whereas the split post 170 may be integrally formed with the latch base 132, as shown in FIGS. 2 and 3. Alternatively, the bore 163 may be formed within the latch base 132 and the split post 170 may be integrally formed with the interposer 160.

According to another embodiment of the present invention and as shown in FIGS. 1, 2, 5 and 6, the inertial latch 130 may further include a spring 150 coupled to the latch base 132 and to the interposer 160, the spring 150 biasing the interposer 160 in a position that allows the head(s) of the HSA 200 to freely leave the ramp load 300 and to travel across the radial width of the disk(s) 120. As shown in FIG. 1, the spring 150 biases the interposer catch surface 162 away from the latching surface 280 of the voice coil portion 250 of the HSA 200, allowing the latter to freely pivot between the outer and inner crash stops 136, 135, thereby permitting the head(s) to sweep across the entire radial width of the disk(s) 120. According to still further embodiments of the present invention, the spring 150 includes and/or is formed of stainless steel. The spring 150 may be a torsion spring, as illustrated in FIGS. 1, 2, 5 and 6, although other spring configurations may be readily implemented within the context of the present invention. The spring 150 should preferably be sufficiently light to allow the inertial latch 130 to trigger (i.e., to engage the latching surface 280) even under low-level shock events (having a magnitude of, for example, 20 g, wherein g corresponds to the acceleration of gravity), but should preferably be sufficiently strong to compensate for the weight of the elongated boom 140. It should be noted that the ramp load 300 may inherently provide some measure of protection from low-level shock events, by virtue of the friction thereof with the fingers(s) 240 of the HSA 200.

During a shock event of sufficient magnitude to overcome at least the biasing force of the spring 150, the interposer 160 is pushed by the elongated boom 140 and caused to pivot about its axis, thereby engaging the interposer catch surface 162 and the latching surface 280 of the voice coil portion 250. After the shock event, the boom 140 no longer pushes the interposer 160 and the biasing force of the spring 150 causes the interposer 160 to return to the position thereof illustrated in FIG. 1. One of the characteristic features of the boom 140, according to a further embodiment of the present invention, is the elongated arm portion 142 best shown in FIGS. 1 and 2. As the boom 140 may be formed of plastic, the slender and elongated arm portion 142 thereof may bow or bend during at least a portion of the duration of the shock event. This bending of the arm portion 142 of the boom 140 tends to maintain the interposer 160 in contact with the latching surface 280 of the voice coil portion 250 of the HSA 200, thus keeping the latching surface 280 engaged with the interposer catch surface 162 during the entire length of the shock event or at least during a portion of the duration of the shock event. Therefore, for relatively long-duration shock events, the boom 140 may bow and continue to push against the interposer 160, thereby prohibiting the release of the interposer 160 and keeping the head(s) of the HSA 200 on the ramp load 300 and minimizing the risk of damage to the head and/or disk(s) 120. Moreover, having an elongated arm portion 142 increases the mass of the boom 140, further contributing to the ability of the boom 140 to resist rotational movements of the drive 100 and, therefore, increasing the ability of the inertial latch 130 to protect the disk(s) 120 and the heads from damage during shock events.

The pivot stroke (allowed range of motion) of the interposer 160 and of the boom 140 is relatively small, on the order of about 1 degrees to about 10 degrees. Preferably, the pivot stroke of the of the interposer 160 and of the boom 140 is between about 2 degrees to about 5 degrees. For example, the stroke of the of the interposer 160 and of the boom 140 may be selected between about 3 degrees to about 4 degrees. Moreover, the boom 140 may pivot further in one direction (as shown in FIG. 6, for example) than in another direction (as shown in FIG. 5, for example). The limited stroke of the boom 140 and the interposer 160 also inherently limits the generation of potentially harmful plastic particulate matter within the drive 100.

As described herein, the disk drive 100 according to the present invention is provided with a simple, cost effective and reliable inertial latch 130. According to preferred embodiments of the present invention, the constituent elements of the inertial latch 130 (spring 150 excepted) are made of plastic and are coupled to one another and to the disk drive base 110 without separate inserts or fasteners, such as, for example, metal screws. Such simplicity of construction facilitates assembly of the interposer 130 and also facilitates the insertion of the inertial latch 130 into the drive 100, further contributing to lessening manufacturing costs, a significant consideration in the highly competitive disk drive market.

According to an embodiment of the present invention, the inertial latch 130 according to the present invention is able to maintain the head(s) on the ramp load 300 under a 2 millisecond shock event having a magnitude of about 25,000 radians/second$^2$, although the present invention may readily be modified to accommodate shocks of other durations and magnitudes. The trigger point (the acceleration that will cause the interposer catch surface 162 to engage the latching surface 280 of the voice coil portion 250) may be selected to be about 8,000 radians/second$^2$, although the inertial latch according to the present invention may be designed to trigger at trigger points corresponding to lesser or greater shocks.

The description of the present invention above is made for illustrative purposes only. Indeed, various modifications will occur to those of skill in this art. For example, the split post 170 as well as the key-shaped post 137 may be configured differently than shown and described herein without, however, departing form the spirit and scope of the present invention. Moreover, although the inertial latch 130 of the present invention is particularly advantageous application within the context of magnetic hard disk drives, the present inertial latch 130 may also readily be adapted to other types of drives, such as optical or hybrid magneto-optical drives, for example.

We claim:

1. A disk drive comprising:
   a disk drive base;
   a head stack assembly pivotally coupled to the disk drive base;
   the head stack assembly including:
      a head; and
      a coil portion coupled to the head, the coil portion having a latching surface;
   a ramp load coupled to the disk drive base, the ramp load for parking the head; and
   an inertial latch including:
      a unitary latch base coupled to the disk drive base;
      an elongated boom pivotally coupled to the latch base;
      a key-shaped post;
      a key-shaped bore;
      the key-shaped post and the key-shaped bore defining means for pivotally coupling the boom to the latch base and for preventing relative vertical movement between the boom and the latch base;
      an elongated interposer pivotally coupled to the latch base;
      the interposer, interacting with the boom during a shock event, for contacting the latching surface such that the head is prevented from leaving the ramp load.

2. The disk drive of claim 1, wherein a portion of the key-shaped post is aligned with a key axis and wherein the key-shaped bore is aligned with a bore axis, the key axis being substantially parallel to the bore axis during assembly of the inertial latch and generally perpendicular to the bore axis when the inertial latch is in an operational state.

3. The disk drive of claim 1, wherein the latch base, the boom and the interposer are formed of plastic.

4. The disk drive of claim 1, further comprising a spring coupled to the latch base and to the interposer, the spring for biasing the interposer in a position for allowing the head to leave the ramp load.

5. The disk drive of claim 4, wherein the spring includes stainless steel.

6. The disk drive of claim 4, wherein the spring is a torsion spring.

7. The disk drive of claim 1, wherein the boom has a first inertia and the interposer has a second inertia, the first inertia being greater than the second inertia.

8. The disk drive of claim 1, wherein the elongated boom is pivotally coupled to the unitary latch base about a pivot axis, and wherein the boom has a center of gravity that is offset from the pivot axis to create a moment of inertia that causes the interposer to pivot relative to the latch base and to contact the latching surface during the shock event.

9. The disk drive of claim 1, wherein the elongated boom includes a plastic arm portion, the arm portion bending to maintain the interposer in contact with the latching surface during at least a portion of a duration of the shock event.

10. The disk drive of claim 1, wherein the disk drive base defines a base bore having a base bore axis and wherein the latch base includes an integrally molded peg adapted to fit within the base bore, the peg having a peg axis that is offset from the base bore axis to provide an interference fit of the peg to the base bore to couple the inertial latch to the disk drive base.

11. The disk drive of claim 1, wherein the key-shaped post is integrally formed with the latch base and the key-shaped bore is positioned on the boom.

12. The disk drive of claim 1, wherein the means for preventing relative vertical movement includes a pair of spaced-apart bumps integrally formed on the key-shaped post.

13. A disk drive comprising:
   a disk drive base;
   a head stack assembly pivotally coupled to the disk drive base;
   the head stack assembly including:
      a head; and
      a coil portion coupled to the head, the coil portion having a latching surface;
   a ramp load coupled to the disk drive base, the ramp load for parking the head; and
   an inertial latch including:
      a unitary latch base coupled to the disk drive base;
      an elongated interposer pivotally coupled to the latch base;
      the interposer for contacting the latching surface during a shock event such that the head is prevented from leaving the ramp load;
      a split post having a first post and a second post spaced-apart from the first post;
      a bore; and
      the split post and the bore defining means for pivotally coupling the interposer to the latch base and for preventing relative vertical movement between the interposer and the latch base.

14. The disk drive of claim 13, wherein the first post is terminated by a first snap feature and the second post is terminated by a second snap feature, the first and second snap features defining the means for preventing relative vertical movement between the interposer and the latch base.

15. The disk drive of claim 13, wherein the latch base, the boom and the interposer are formed of plastic.

16. The disk drive of claim 13, further comprising a spring coupled to the latch base and to the interposer, the spring for biasing the interposer in a position for allowing the head to leave the ramp load.

17. The disk drive of claim 16, wherein the spring includes stainless steel.

18. The disk drive of claim 16, wherein the spring is a torsion spring.

19. The disk drive of claim 13, wherein the disk drive base defines a base bore having a base bore axis and wherein the latch base includes an integrally molded peg adapted to fit within the base bore, the peg having a peg axis that is offset from the base bore axis to provide an interference fit of the peg to the base bore to couple the inertial latch to the disk drive base.

20. The disk drive of claim 13, wherein the split post is integrally formed with the latch base and the bore is positioned on the interposer.

* * * * *